(12) United States Patent
Talbert et al.

(10) Patent No.: US 7,890,393 B2
(45) Date of Patent: Feb. 15, 2011

(54) METHOD AND SYSTEM FOR COMPLETING A TRANSACTION BETWEEN A CUSTOMER AND A MERCHANT

(75) Inventors: Vincent W. Talbert, Cockeysville, MD (US); Thomas H. Keithly, Monkton, MD (US); Daniel A. Hirschfeld, Timonium, MD (US); Mark L. Lavelle, Govans, MD (US)

(73) Assignee: eBay, Inc., San Jose, CA (US)

( * ) Notice: Subject to any disclaimer, the term of this patent is extended or adjusted under 35 U.S.C. 154(b) by 1307 days.

(21) Appl. No.: 10/470,223

(22) PCT Filed: Feb. 7, 2002

(86) PCT No.: PCT/US02/03743

§ 371 (c)(1),
(2), (4) Date: Jul. 23, 2003

(87) PCT Pub. No.: WO02/063432

PCT Pub. Date: Aug. 15, 2002

(65) Prior Publication Data

US 2004/0078328 A1    Apr. 22, 2004

(51) Int. Cl.
*G06Q 40/00* (2006.01)
(52) U.S. Cl. .............................. 705/35; 705/39; 705/44
(58) Field of Classification Search ................ 705/26, 705/35, 39, 38, 17, 44
See application file for complete search history.

(56) References Cited

U.S. PATENT DOCUMENTS

| | | | |
|---|---|---|---|
| 3,920,908 A | 11/1975 | Kraus | |
| 4,191,860 A | 3/1980 | Weber | |
| 4,291,198 A | 9/1981 | Anderson et al. | |
| 4,757,267 A | 7/1988 | Riskin | |
| 4,969,183 A | 11/1990 | Reese | |
| 4,996,705 A | 2/1991 | Entenmann et al. | |
| 5,010,238 A | 4/1991 | Kadono et al. | |
| 5,012,077 A | 4/1991 | Takano | |
| 5,120,945 A | 6/1992 | Nishibe | |
| 5,329,589 A | 7/1994 | Fraser et al. | |
| 5,446,885 A | 8/1995 | Moore et al. | |
| 5,537,315 A | 7/1996 | Mitcham | |
| 5,754,655 A * | 5/1998 | Hughes et al. | 705/70 |

(Continued)

FOREIGN PATENT DOCUMENTS

EP    0 338 568 A2    10/1989

(Continued)

*Primary Examiner*—James A Kramer
*Assistant Examiner*—Hao Fu
(74) *Attorney, Agent, or Firm*—Haynes and Boone, LLP.

(57) ABSTRACT

A computer-implemented method and system for completing a transaction between a customer (10) and at least one merchant (20), including the steps of: (a) initiating a transaction by the customer (10) with a merchant (20); (b) communicating an authorization request, including customer data and transaction specific data, by the merchant (20) to a transaction system (26); (c) authenticating the customer (10) by the transaction system (26); (d) authorizing the transaction by the transaction system (26); (e) communicating the authorization response by the transaction system (26) to the merchant (20); and (f) completing the transaction between the merchant (20) and the customer (10). An apparatus for implementing the method is disclosed.

45 Claims, 8 Drawing Sheets

U.S. PATENT DOCUMENTS

| | | | |
|---|---|---|---|
| 5,793,028 A * | 8/1998 | Wagener et al. | 235/380 |
| 5,794,221 A | 8/1998 | Egendorf | |
| 5,870,721 A | 2/1999 | Norris | |
| 5,883,810 A | 3/1999 | Franklin et al. | |
| 5,940,811 A | 8/1999 | Norris | |
| 6,000,832 A | 12/1999 | Franklin et al. | |
| 6,029,150 A * | 2/2000 | Kravitz | 705/39 |
| 6,029,890 A | 2/2000 | Austin | |
| 6,032,136 A | 2/2000 | Brake, Jr. et al. | |
| 6,078,891 A | 6/2000 | Riordan et al. | |
| 6,098,053 A | 8/2000 | Slater | |
| 6,105,007 A | 8/2000 | Norris | |
| 6,122,624 A | 9/2000 | Tetro et al. | |
| 6,188,994 B1 | 2/2001 | Egendorf | |
| 6,202,053 B1 | 3/2001 | Christiansen et al. | |
| 6,227,447 B1 | 5/2001 | Campisano | |
| 6,289,319 B1 | 9/2001 | Lockwood | |
| 6,317,783 B1 | 11/2001 | Freishtat et al. | |
| 6,332,134 B1 | 12/2001 | Foster | |
| 6,341,724 B2 | 1/2002 | Campisano | |
| 6,351,739 B1 | 2/2002 | Egendorf | |
| 6,477,578 B1 | 11/2002 | Mhoon | |
| 6,505,171 B1 | 1/2003 | Cohen et al. | |
| 6,675,153 B1 * | 1/2004 | Cook et al. | 705/74 |
| 6,704,714 B1 | 3/2004 | O'Leary et al. | |
| 6,785,661 B1 | 8/2004 | Mandler et al. | |
| 6,820,202 B1 | 11/2004 | Wheeler et al. | |
| 6,839,690 B1 | 1/2005 | Foth et al. | |
| 6,839,692 B2 | 1/2005 | Carrott et al. | |
| 6,868,408 B1 | 3/2005 | Rosen | |
| 6,883,022 B2 | 4/2005 | Wyngarden | |
| 6,889,325 B1 | 5/2005 | Sipman et al. | |
| 6,915,272 B1 | 7/2005 | Zilliacus et al. | |
| 6,931,382 B2 | 8/2005 | Laage et al. | |
| 6,957,334 B1 | 10/2005 | Goldstein et al. | |
| 6,970,853 B2 | 11/2005 | Schutzer | |
| 6,976,008 B2 | 12/2005 | Egendorf | |
| 6,980,970 B2 | 12/2005 | Krueger et al. | |
| 7,006,986 B1 | 2/2006 | Sines et al. | |
| 7,051,001 B1 | 5/2006 | Slater | |
| 7,107,243 B1 | 9/2006 | McDonald et al. | |
| 7,177,836 B1 | 2/2007 | German et al. | |
| 7,263,506 B2 | 8/2007 | Lee et al. | |
| 7,406,442 B1 * | 7/2008 | Kottmeier et al. | 705/35 |
| 2001/0034702 A1 * | 10/2001 | Mockett et al. | 705/39 |
| 2001/0034724 A1 | 10/2001 | Thieme | |
| 2002/0007302 A1 * | 1/2002 | Work et al. | 705/10 |
| 2002/0007341 A1 | 1/2002 | Lent et al. | |
| 2002/0032860 A1 | 3/2002 | Wheeler et al. | |
| 2002/0035538 A1 | 3/2002 | Moreau | |
| 2002/0052833 A1 | 5/2002 | Lent et al. | |
| 2002/0069166 A1 | 6/2002 | Moreau et al. | |
| 2002/0087467 A1 | 7/2002 | Mascavage, III et al. | |
| 2002/0099649 A1 | 7/2002 | Lee et al. | |
| 2002/0107793 A1 | 8/2002 | Lee | |
| 2002/0112160 A2 | 8/2002 | Wheeler et al. | |
| 2002/0120537 A1 * | 8/2002 | Morea et al. | 705/35 |
| 2002/0120864 A1 | 8/2002 | Wu et al. | |
| 2002/0156688 A1 * | 10/2002 | Horn et al. | 705/26 |
| 2002/0178071 A1 | 11/2002 | Walker et al. | |
| 2003/0120615 A1 * | 6/2003 | Kuo | 705/78 |
| 2003/0200184 A1 | 10/2003 | Dominguez et al. | |
| 2004/0151292 A1 * | 8/2004 | Larsen | 379/114.2 |
| 2005/0038715 A1 | 2/2005 | Sines et al. | |
| 2005/0071266 A1 | 3/2005 | Eder | |
| 2006/0178988 A1 | 8/2006 | Egendorf | |
| 2006/0184428 A1 | 8/2006 | Sines et al. | |
| 2006/0184449 A1 | 8/2006 | Eder | |
| 2006/0184570 A1 | 8/2006 | Eder | |
| 2006/0248016 A1 | 11/2006 | Ginter et al. | |
| 2007/0005445 A1 | 1/2007 | Casper | |
| 2008/0046334 A1 | 2/2008 | Lee et al. | |
| 2008/0052244 A1 | 2/2008 | Tsuei et al. | |

FOREIGN PATENT DOCUMENTS

| | | | |
|---|---|---|---|
| EP | 0829813 | * | 3/1996 |
| WO | WO 88/10467 A1 | | 12/1988 |
| WO | WO 00/02150 | * | 1/2000 |
| WO | WO 00/02150 A1 | | 1/2000 |
| WO | WO 00/67177 | | 11/2000 |

* cited by examiner

METHOD AND SYSTEM FOR COMPLETING A TRANSACTION BETWEEN A CUSTOMER AND A MERCHANT

BACKGROUND OF THE INVENTION

1. Field of the Invention

The present invention relates generally to transaction systems, and in particular, to a method and system for completing a transaction between a customer and at least one merchant.

2. Description of the Prior Art

In order to enable convenient purchases of goods and services by consumers, the financial service industry has developed many alternative payment methods, including checks, ATM or debit cards, credit cards or charge cards. Until the birth of virtual commerce, as discussed below, these payment options provided adequate convenience and transactional security to consumers and merchants in the marketplace. Transactional security is defined as the security offered by a payment method to the buyer and the seller in a purchase transaction that the purchase event will not result in breach of personal information or financial loss from fraud perpetrated upon either party involved.

Virtual commerce and the growth of the Internet as a medium for commerce has put pressure on the payment options cited above on both the convenience and transactional security dimensions. Specifically, checks require physical presentment and clearing of the check prior to shipment of goods. Credit cards are more convenient for the consumer, but are subject to fraudulent use via theft of the account number, expiration date and address of the consumer. Debit cards lack a credit facility and often require a separate personal identification number (PIN) number to be used. The financial services industry is currently attempting to improve performance of existing products by introducing disposable account numbers and electronic checks. Today, all of the improvements offered have sought to improve transactional security at the expense of the convenience during the purchase process.

Each of the payment options in place today has significant shortcomings when applied to remote purchases. Remote purchases are defined as those purchases where the buyer and the seller (the merchant) are not physically proximate during the transaction. Specific examples of remote purchases are mail order, telephone order, Internet and wireless purchases.

Merchants have long battled the problem of fraudulent purchases. Each new payment option and every new sales channel (in-store, telephone, mail, and Internet) has, in turn, spawned innovation on the part of consumers willing to perpetrate fraud in order to obtain goods and services without paying for them. In recent years, the birth of the Internet commerce industry and the continued growth in mail order and telephone order commerce has pushed the credit card to the forefront of these battles. Merchants are forced to rely on credit cards because it is currently their only option in the remote purchase environment. Unfortunately, credit cards offer low transactional security to both merchants and consumers when used for remote purchases.

Low transactional security in remote purchases leads to significant costs for consumers and merchants. Consumer costs include the impairment of their credit record, the inconvenience of changing all of their credit card accounts and the financial costs of resolving the situation. Many consumers have reacted to this by avoiding remote purchasing, particularly on the Internet.

Merchant costs incurred to mitigate fraud losses include the cost of incremental labor, hardware and software to implement additional security checks in their sale/order entry software, higher transaction processing expense in the form of discount rates for credit cards and NSF fees for checks and higher fraud charge-offs for undetected fraudulent purchases.

Essentially these costs are forced onto the parties involved in the remote purchase transaction because other card-based options failed to incorporate adequate security in two ways:

1. The account number is used as a public credential along with expiration dates and very limited address information. A public credential is defined as a transaction-enabling form of identification that accesses financial balances or credit lines or credit in order to complete a purchase of goods or services. For example, in the credit card arena, account numbers are the primary enablers of access to purchase. The fact that the account number is the key to credit causes the user to focus on creating counterfeit numbers and stealing valid numbers via a variety of methods.

2. The current industry standard process for authorizing a purchase for a credit or charge card customer provides inadequate authentication to protect merchants and consumers from external cost to the remote purchase transaction. The process, instead, focuses only on whether the account in use is open and in good standing and whether there exists adequate credit available to fund the purchase. Fraud detection routines in use are typically statistically-based pattern recognition algorithms, but are not capable of authenticating a customer. In fact, the current standard authorization message formats do not support the transmission of vital authentication information from the merchant to the issuer of the credit or charge card. Some products do employ a very limited verification key built on portions of the customer's name and address, but the keys in use are not adequate to create a high level of transactional security.

Individual consumers prefer to purchase from individual merchants. Some consumers find acceptable payment options a barrier to purchase, for example, Internet purchases where the barriers are possession of a credit card, willingness to disclose a credit card number, inconvenience of remembering 16 digit numbers, and so on.

The alternate methods in which this problem has been solved, and their drawbacks, are as follows. Credit cards, flat currencies and novel payment mechanisms have been one such solution. In these cases, a third party defers consumer relationship costs among multiple merchants. In operation, the consumer provides to the merchant a key provided by the trusted third party (credit card issuer) which signifies or uniquely identifies the consumer/third-party relationship. The problem is that in all cases the consumer must have a previously established relationship with the third party (credit card issuer). Huge costs of customer acquisition limit the viability of business models. Another solution has been a merchant specific bill. However, the incremental costs of rendering, collecting and administrating their own bill has a dilutive effect on merchant profitability.

SUMMARY OF THE INVENTION

It is an object of the present invention to provide a method and system that overcomes the deficiencies of prior art systems. It is another object of the present invention to provide a method and system that eliminates the use of the public key (e.g., a credit card number) and implements a private key to access purchasing power. It is another object of the present invention to provide a method and system that converts the current public key or account number to a private credential, which is shared on an authenticated basis between the merchant and the transaction system. It is yet another object of the present invention to provide a method and system that implements a new business process to robustly authenticate a transaction prior to considering whether the purchase will be approved. It is a still further object of the present invention to provide a method and system that expands industry standard messaging formats to incorporate additional customer information. It is another object of the present invention to provide a method and system that positively authenticates a customer's request for every transaction using private credentials and validations, and which uses additional data, e.g., IP address, bill-to address, ship-to address, telephone number, personal security answers, date of birth, social security number, etc. It is yet another object of the present invention to provide a method and system allowing a merchant and a consumer or customer to enter into a relationship without the need for the customer to have a pre-existing relationship with a third-party credit source. It is yet another object of the present invention to provide a method and system to allow the merchant to provide a third party with sufficient information to collect on the consumer's obligation to the merchant, thereby allowing the third party to achieve economic and risk mitigation efficiency by aggregating all of the transactions, which are attributable to a single consumer, from multiple merchants onto a single bill and mailing of e-mailing the single bill to the consumer.

The present invention is directed to a method and system for completing a transaction between a customer and at least one merchant, including the steps of: (a) initiating a transaction by the customer with the merchant; (b) communicating an authorization request including customer data and transaction specific data by the merchant to a transaction system; (c) authenticating the customer by the transaction system; (d) authorizing the transaction by the transaction system; (e) communicating the authorization response by the transaction system to the merchant; and (f) completing the transaction between the merchant and the customer. The present invention is also directed to a system and apparatus for implementing the above-described method.

The present invention, both as to its construction and its method of operation, together with additional objects and advantages thereof, will best be understood from the following description of specific embodiments when read in connection with the accompanying drawings.

DETAILED DESCRIPTION OF THE PREFERRED EMBODIMENTS

Figure 1:
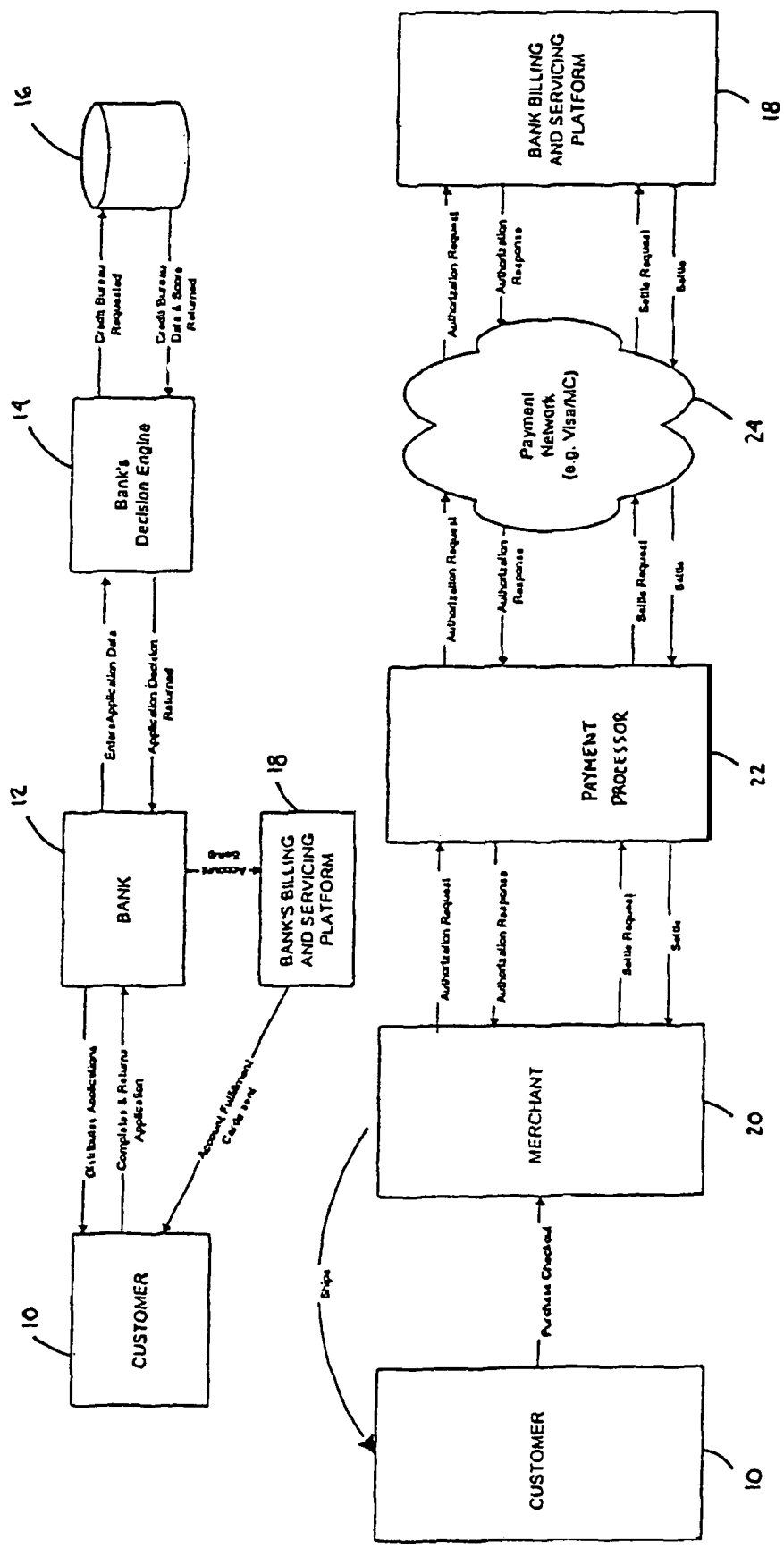
FIG. 1 is a schematic view of a transaction system according to the prior art.

Typically, wireless purchases, such as Internet, telephone, e-mail and wireless device purchases, are conducted using a customer 10 credit card. This process is illustrated in FIG. 1. However, in order to receive a credit card, the customer 10 must receive a credit card application from a bank 12. These applications are distributed by the bank 12 through various channels, such as direct mail, "take-ones" and phone calls. Next, the customer 10 completes the application and returns it to the bank 12. The bank 12 then enters the application data into a bank decision engine 14, which, in turn, requests a credit report from a third-party credit system 16 on the customer 10. The third-party credit system 16 returns the credit data and a score for the customer 10. The bank decision engine 14 uses the credit data and the application data to determine if the customer 10 is qualified for the credit card. The bank decision engine 14 then returns the credit decision to the bank 12. If approved, the bank 12 sets up an account for the customer 10 on the bank billing and servicing platform 18. Finally, the bank billing and servicing platform 18 mails the credit cards to the customer 10.

When the customer 10 wishes to make a purchase, the customer 10 visits a merchant 20 to select the goods or services, enters the checkout process and inputs the credit card number and expiration date for payment. The merchant 20 captures the customer credit card account number and submits it with the transaction details as an authorization request to a payment processor 22. The payment processor 22 submits the authorization request to the payment network 24, which then passes the authorization request to the bank billing and servicing platform 18. The bank billing and servicing platform 18 checks to see if there is available credit in the account and returns an authorization response to the payment network 24. Next, the payment network 24 passes the authorization response to the payment processor 22, who then passes the authorization response to the merchant 20. Finally, the merchant 20 ships the goods or performs the services to or for the customer 10.

Turning to the payment process, the merchant 20 sends the payment processor 22 a settlement/deposit request. The payment processor 22 sends the payment network 24 this request, and the payment network 24 sends this request to the bank billing and servicing platform 18. At this point, the bank 12 posts settlement to a transaction database. The bank 12 remits settlement through the payment network 24, and the settlement record is sent and deposit is made to the payment network 24. Next the payment network 24 sends the settlement record and makes a deposit to the payment processor 22. Finally, the payment processor 22 sends the settlement record and makes the deposit to the merchant 20.

The above-described prior art system is particularly susceptible to fraud, resulting from the theft of the customer account number. Further, the prior art system lacks adequate customer authentication and does not enforce a positive authentication of the customer 10 at the time of a purchase request. For example, the credit card issuer receives the account number, expiration date and limited numeric/address fields in order to verify the identity of the purchaser. As long as the numeric/address information matches, the expiration date is valid, credit is sufficient and the account is in good standing, the sale is approved. Clearly, such a process is far from secure and has resulted in a considerable amount of fraud.

In order to overcome such deficiencies, the present invention is directed to a method and system for completing a transaction, namely a purchase transaction, between the customer 10 and a merchant 20, and preferably, many different merchants 20. The present invention integrates and efficiently manages the overall authorization and transactional process, and excludes the need for interaction with the bank 12, obtaining a credit card, and further eliminates, or drastically reduces, consumer fraud. The term "credit" is meant to include traditional credit, purchasing authority, alternative payment processes and other similar processes.

In particular, the present invention is a computer-implemented method for completing a transaction between the customer 10 and the merchant 20 and includes the steps of: (a) initiating a transaction by the customer 10 with the merchant 20; (b) communicating an authorization request, including customer data and transaction specific data, by the merchant 20 to a transaction system 26; (c) authenticating the customer 10 by the transaction system 26; (d) authorizing the transaction by the transaction system 26; (e) communicating the authorization response by the transaction system 26 to the merchant 20; and (f) completing the transaction between the merchant 20 and the customer 10. This process occurs each time the customer 10 interacts with the same merchant 20, or other merchants 20 that are approved by the transaction system 26. As will be described in detail hereinafter, it is this transaction system 26 that provides both the merchant 20 and the customer 10 with a secured transaction and obviates the need for the customer 10 acquisition of a credit card from a bank 12. The above-described computer-implemented method may be implemented on a computer, personal digital assistant, telephone, cell phone or other intelligent device.

The merchant 20, who is affiliated with or approved by the transaction system 26, presents the customer 10 with the opportunity to initiate the transaction. For example, the merchant 20 may have a web site on the Internet, through which the customer 10 desires to purchase goods or services. Further, the merchant 20 web site may be a secured merchant system, such as a system that requires a log-in sequence. When using this secured merchant system, the transaction becomes more secure, in that an authorized user, or a user who wishes to perpetrate fraud, must first acquire the user name and password of the customer 10 in order to first enter the merchant 20 secured merchant system.

Figure 2:
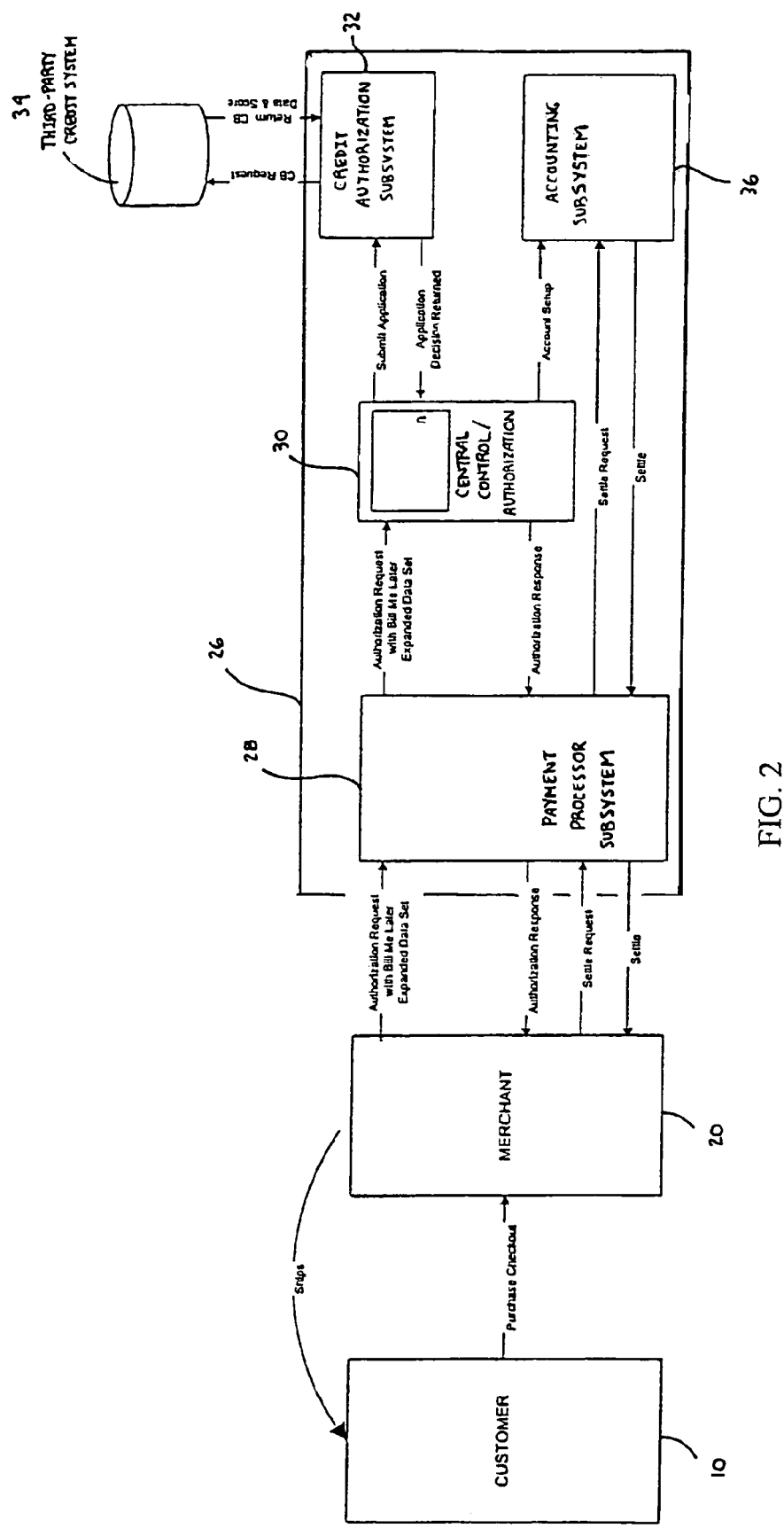
FIG. 2 is a schematic view of a first embodiment of a method and system for completing a transaction between a customer and a merchant according to the present invention.

In a first embodiment, as illustrated in FIG. 2, the customer 10 initiates the transaction with the merchant 20. Next, the merchant 20 communicates an authorization request to the transaction system 26. For a first time customer 10, the merchant 20 must collect and transmit an expanded data set or complete customer profile to the transaction system 26. For example, the merchant 20 may collect and transmit the information or data fields listed in Table 1 (as defined in Table 2) to the transaction system 26. This one-time application process is required in order to establish a customer account on the transaction system 26.

TABLE 1

| Data Element | Type | Length | Format | Source | Presence |
|---|---|---|---|---|---|
| Merchant ID | Numeric | 10 | N(10) | Merchant | Required |
| Account No. | Numeric | 16 | N(16) | Merchant | Optional |
| Transaction ID | Numeric | 12 | N(12) | Merchant | Required |
| Transaction Date | Numeric | 8 | ccyymmdd | Merchant | Required |
| Transaction Time | Numeric | 6 | hhmmss | Merchant | Required |
| Transaction Amount | Numeric | 7 | N(5.2) | Merchant | Required |
| Currency Type | Alpha. | 3 | A(3) | Merchant | Required |
| Customer First Name | Alpha. | 16 | A(16) | Merchant | Required |
| Customer M. I. | Alpha. | 1 | A(1) | Merchant | Optional |
| Customer Last Name | Alpha. | 20 | A(20) | Merchant | Required |
| Bill-to Street Number | Numeric | 7 | N(7) | Merchant | Required |
| Bill-to Street Name | A/N | 20 | A/N(16) | Merchant | Required |
| Bill-to Apartment No. | A/N | 3 | A/N(3) | Merchant | Optional |
| Bill-to City | Alpha. | 16 | A(16) | Merchant | Required |
| Bill-to ZIP Code | Numeric | 9 | N(9) | Merchant | Required |
| Bill-to State | Alpha. | 2 | A(2) | Merchant | Required |
| Ship-to First Name | Alpha. | 16 | A(16) | Merchant | Optional |
| Ship-to M. I. | Alpha. | 1 | A(1) | Merchant | Optional |
| Ship-to Last Name | Alpha. | 20 | A(20) | Merchant | Optional |
| Ship-to Street Number | Numeric | 7 | N(7) | Merchant | Required |
| Ship-to Street Name | A/N | 20 | A/N(16) | Merchant | Required |
| Ship-to Apartment No. | A/N | 3 | A/N(3) | Merchant | Optional |
| Ship-to City | Alpha. | 16 | A(16) | Merchant | Required |
| Ship-to ZIP Code | Numeric | 9 | N(9) | Merchant | Required |
| Ship-to State | Alpha. | 2 | A(2) | Merchant | Required |
| Customer Home Phone | Numeric | 10 | N(10) | Merchant | Required |
| Customer E-mail Address | A/N | 24 | A/N(16) | Merchant | Required |
| Customer DOB | Numeric | 8 | ccyymmdd | Merchant | Required |
| Customer SSN | Numeric | 9 | N(9) | Merchant | Optional |
| Customer Annual Income | Numeric | 9 | N(9) | Merchant | Optional |
| Customer IP Address | Numeric | 20 | N(20) | Merchant | Required |
| Merchant Promotional Code | Numeric | 6 | N(6) | Merchant | Required |
| T&C Version | Numeric | 2 | N(2) | Merchant | Optional |
| Merchant Fraud Index | Numeric | 3 | N(3) | Merchant | Optional |

TABLE 1-continued

| Data Element | Type | Length | Format | Source | Presence |
|---|---|---|---|---|---|
| Customer Registration Date | Numeric | 8 | ccyymmdd | Merchant | Required |
| Customer Type Flag | Alpha. | 2 | A(2) | Merchant | Required |
| Item Category | Alpha. | 4 | N(4) | Merchant | Required |
| Customer Checking Acct | Alpha. | 1 | A(1) | Merchant | Optional |
| Customer Savings Acct | Alpha. | 1 | A(1) | Merchant | Optional |
| Customer Employer | Alpha. | 20 | A(20) | Merchant | Optional |
| Customer Work Telephone | Numeric | 10 | N(10) | Merchant | Optional |
| Customer Residential Status | Alpha. | 1 | A(1) | Merchant | Optional |
| Cust. Years at Residence | Numeric | 2 | N(2) | Merchant | Optional |
| Cust. Years at Employer | Numeric | 2 | N(2) | Merchant | Optional |

TABLE 2

| (Merchant Authentication Request Transaction) | |
|---|---|
| Merchant ID | A unique numeric identifier assigned by transaction system to each member merchant. |
| Transaction ID | A unique sequential number assigned by the merchant to each transaction sent in order to track and match-off corresponding responses. |
| Account Number | The unique 16-digit number assigned to these customers. For new customers this number is determined by transaction system and passed to the merchant in the authentication response (Auth-E response). For subsequent transactions, this number is supplied to transaction system by the merchant in the Authentication Request Transaction (Auth-E request). |
| Date Stamp | Transaction date in ccyymmdd. |
| Time Stamp | The time of the transaction (GMT) in hhmmss format in military format. |
| Transaction Amount | The total amount inclusive of shipping and tax for the sale. |
| Currency Type | The currency type for this sale in standard country format. |
| Customer First Name | The given name for the customer. |
| Customer Middle Initial | The first letter of the customer's middle name. |
| Customer Last Name | The family name for the customer. |
| Bill-to Street Number | The street number of the customer's bill-to address. |
| Bill-to Street Name | The street name of the customer's bill-to address. |
| Bill-to Apartment Number | The customer's bill-to apartment number, if applicable. |
| Bill-to City | The bill-to city of the customer. |
| Bill-to State | The bill-to state of the customer. |
| Bill-to ZIP code | The bill-to ZIP code for the customer. |
| Ship-to Street Number | The street number of the customer's Ship-to address. |
| Ship-to Street Name | The street name of the customer's Ship-to address. |
| Ship-to Apartment Number | The customer's Ship-to apartment number, if applicable. |
| Ship-to City | The Ship-to city of the customer. |
| Ship-to State | The Ship-to state of the customer. |
| Ship-to ZIP Code | The Ship-to ZIP code for the customer. |
| Shipping Cost | The total shipping cost billed to the customer for this transaction. |
| Customer Home Phone | The home telephone number for the customer. |
| Customer E-mail Address | The primary E-mail address for the customer. |
| Customer DOB | The customer's date of birth in ccyymmdd format. |
| Customer SSN | Used only for thick underwriting format; the customer's social security number. |
| Customer Annual Income | Used only for thick underwriting format; the gross annual household income for the customer, if applicable. |
| T&C Version | A unique identifier for the terms and conditions served to the customer for this transaction. |
| Merchant Promo. Code | The promotional code identifier for this transaction, if applicable. This code is given to the merchant to support payment of co-marketing obligations (free shipping for example). |
| Merchant Fraud Index | A fraud index provided by the merchant. The merchant defines the format and values for this data element. |
| Customer IP Address | The customer's IP address left-padded with spaces. |

TABLE 2-continued (Merchant Authentication Request Transaction)

| | |
|---|---|
| Customer Registration Date | The date that the merchant registered the customer. |
| Customer Type Flag | A flag that identifies the customer as new or existing with the merchant. The definition of existing is - a customer who has completed at least one prior purchase with the merchant with no subsequent financial loss for the transaction |
| Item Category | A numeric identifier for the category of item being purchased from the merchant. For multiple item purchases, the value is determined by the highest priced item in the shopping cart. The category codes are provided by transaction system. |
| Customer Checking Account | Optional, reserved for future use, a yes/no flag indicating whether the customer has a checking account. Not used at the current time. |
| Customer Savings Account | Optional, reserved for future use, a yes/no flag indicating whether the customer has a savings account. Not used at the current time. |
| Customer Employer | Optional, reserved for future use, the customer's current employer. |
| Customer Work Telephone | Optional, reserved for future use, the customer's work telephone. |
| Customer Res. Status | Optional, reserved for future use, the customer's residential status. (O-own, R-rent, L-live with parents, A-all other). |
| Customer Years at Residence | Optional, reserved for future use, the years at the current address for this customer. |
| Customer Years at Employer | Optional, reserved for future use, the years at the current employer for this customer. |

It is envisioned that the authorization request, along with the expanded data set, is sent to a payment processor subsystem 28, which is responsible for collecting, formatting and transmitting the appropriate information to a central control/authorization subsystem 30. Both the payment processor subsystem 28 and the central control/authorization subsystem 30 are part of the transaction system 26. Next, the central control/authorization subsystem 30 transmits this customer profile, in the form of an application, to the credit authorization subsystem 32, which is also part of the transaction system 26. It is also envisioned that the central control/authorization subsystem 30 is managed and/or operated by a third party.

The credit authorization subsystem 32 is configured to make decisions regarding the credit-worthiness of the customer 10 (or applicant), and also establishes a maximum credit quantity. After the credit authorization subsystem 32 has reached a decision, an authorization response for the customer 10, as well as the transaction requested, is communicated to the central control/authorization subsystem 30. It is also envisioned that the credit authorization subsystem 32 can transmit the customer data to a third-party credit system 34. This third-party credit system 34 performs a credit check of the customer 10 and communicates an authorization response back to the credit authorization subsystem 32 of the transaction system 26. While the credit authorization subsystem 32 is configured to be able to determine the credit-worthiness of the customer 10 without any outside consultation, for a new and unapproved customer, it is often desirable to seek the recommendation of the outside third-party credit system 34. Further, the third-party credit system 34 may consult with and receive information from a credit bureau or other third-party credit and customer databases. The authorization response from the third-party credit system 34 may include a customer credit score, and the credit authorization subsystem 32 may establish a maximum credit amount based upon this customer credit score.

If approved, a customer account is established on the transaction system 26. Also, the transaction system 26 creates a customer-specific authorization key, which may be based or at least partially derived from the customer data submitted by the merchant 20. Also, the authorization key may be identical to the customer account number. In addition, this authorization key is made up of digits, letters, and/or symbolic characters. While it is envisioned that this authorization key is customer specific and is able to be used among multiple merchants 20, it is also possible that the customer 10 is assigned multiple authorization keys (typically, the customer account number remains the same). The reason for using multiple authorization keys is the ability to have a customer-specific authorization key for different merchants 20. This would allow the transaction system 26 to allow merchant-specific functionality as to the same customer 10. In order to provide even more security, the authorization key may be encrypted prior to any communication to the merchant 20.

The customer account is established by and tracked on an accounting subsystem 36, which is also part of the overall transaction system 26. While this accounting subsystem 36 may be part of the transaction system 26, it is also envisioned that a third-party accounting system 38 be utilized. Using a third-party accounting system 38 allows the transaction system 26 to avoid creating its own accounting subsystem 36 and associated infrastructure. Either the accounting subsystem 36 or the third-party accounting system 38 establishes a customer accounting database in order to track the customer 10 transactions and update the customer account on the customer accounting database.

After the customer account has been established, activated and approved, the central control/authorization subsystem 30 transmits the authorization response either directly to the merchant 20 or through the payment processor subsystem 28 to the merchant 20. The authorization key is also sent to the merchant 20, thus allowing the repeat customer 10 to initiate a second or subsequent transaction with the merchant 20, who transmits the authorization key to the transaction system 26. This then avoids the need for the merchant 20 to transmit the lengthy data set, and instead, to merely transmit the authorization key and the transaction specific data to the transaction system 26.

Assuming that the transaction for the customer 10 has been approved, the merchant completes the transaction by transmitting an acknowledgement to the customer 10 or shipping the goods to the customer 10. If the customer 10 has ordered a service, as opposed to a good, the merchant 20 may then confirm service dates, costs and other pertinent information. The authorization response may include the information or data fields listed in Table 3 (as defined in Table 4).

TABLE 3

| Data Element | Type | Length | Format | Source | Presence |
|---|---|---|---|---|---|
| Merchant ID | Numeric | 10 | N(10) | Merchant | Required |
| Transaction ID | Numeric | 12 | N(12) | Merchant | Required |
| Transaction Date | Numeric | 8 | ccyymmdd | Merchant | Required |
| Transaction Time | Numeric | 6 | hhmmss | Merchant | Required |
| Transaction Amount | Numeric | 7 | N(5.2) | Merchant | Required |
| Authentication Response Code | Numeric | 3 | N(3) | Transaction System | Required |
| Customer Account Number | Numeric | 16 | N(16) | Transaction System | Required |
| Authentication Control Code | Numeric | 6 | N(6) | Transaction System | Required |
| Authentication Message 1 | Alpha. | 20 | A(20) | Transaction System | Required |
| Authentication Message 2 | Alpha. | 20 | A(20) | Transaction System | Optional |
| Authentication Message 3 | Alpha. | 20 | A(20) | Transaction System | Optional |

TABLE 4

| | |
|---|---|
| Merchant ID | A unique numeric identifier assigned to each merchant. This identifier allows for control of all merchant-specific processing. |
| Transaction ID | A unique number assigned by the merchant to each transaction sent in order to track and match-off corresponding responses. |
| Date Stamp | Transaction date in ccyymmdd. |
| Time Stamp | The time of the transaction (GMT) in hhmmss format in military format. |
| Transaction Amount | The total amount inclusive of shipping and tax for the sale. |
| Authentication Response Code | A-approve, D-decline, T-Thick Underwriting required. |
| Customer Account Number | The 16-digit account number assigned to this customer. This is to be retained by the merchant and used for subsequent transactions. |
| Authentication Message 1–3 | Optional, user format fields that can be used by transaction system and the merchant to coordinate special processing for customers. |
| Authentication Control Code | A numeric code provided by transaction system for all approvals. This code can be retained and passed through to transaction system in the settlement record(s) associated with this authorization, no other authorization is necessary. |

The merchant 20 may present the present invention as a payment option to the customer 10 using basic presentation rules. For example, the customer 10 may be presented with a maximum purchase amount eligible, or other such information. Also, it may be preferable for new applicants, who are not verified or known by the merchant 20, to match the ship-to address with the bill-to address. The merchant 20 also maintains an accurate list of pre-approved customers 10, if such a pre-approved program is in place with the merchant 20.

As with the other systems that make up the transaction system 26, the payment processor subsystem 28 may also be substituted with a third-party payment processor system 40. The benefit of using a third-party payment processor system 40 is its existing infrastructure and its ability to be a merchant aggregator. In addition, the third-party payment processor system 40 may take care of the formatting of authorization requests, formatting of customer data, and even may act as a marketer of the transaction system 26. Also, such a design would allow the third-party payment processor system 40 to carry all the merchant credit risk, while the present invention would carry the consumer credit risk.

As discussed above, the accounting subsystem 36 of the transaction system 26 may also be replaced by the third-party accounting system 38. In this role, the third-party accounting system 38 would be responsible for the creation and maintenance of the customer accounts; customer service and collections on-line systems; statement rendering; initiates settlement; remittance processing for customer payments on accounts; application of appropriate pricing per terms and conditions; credit bureau reporting for all existing customers; and real-time account balance and status rendering for authorization processing. While the accounting subsystem 36 may be internal to the transaction system 26, the use of a third-party accounting system 38 is preferable for managing customer account information and for customer account maintenance.

Similarly, while the credit authorization subsystem 32 may be provided with a full range of credit functionality and decision making capabilities, the use of the third-party credit system 34 provides additional functionality, such as credit bureau agency or other credit database selection; credit report retrieval; credit report summarization; credit criteria application; verification queue assignment; decision review queue assignment; and decline letter rendition. Further, the third-party credit system 34 may manage the application of pre-approval criteria to potential customers 10 for any pre-approved programs implemented.

Figure 3:
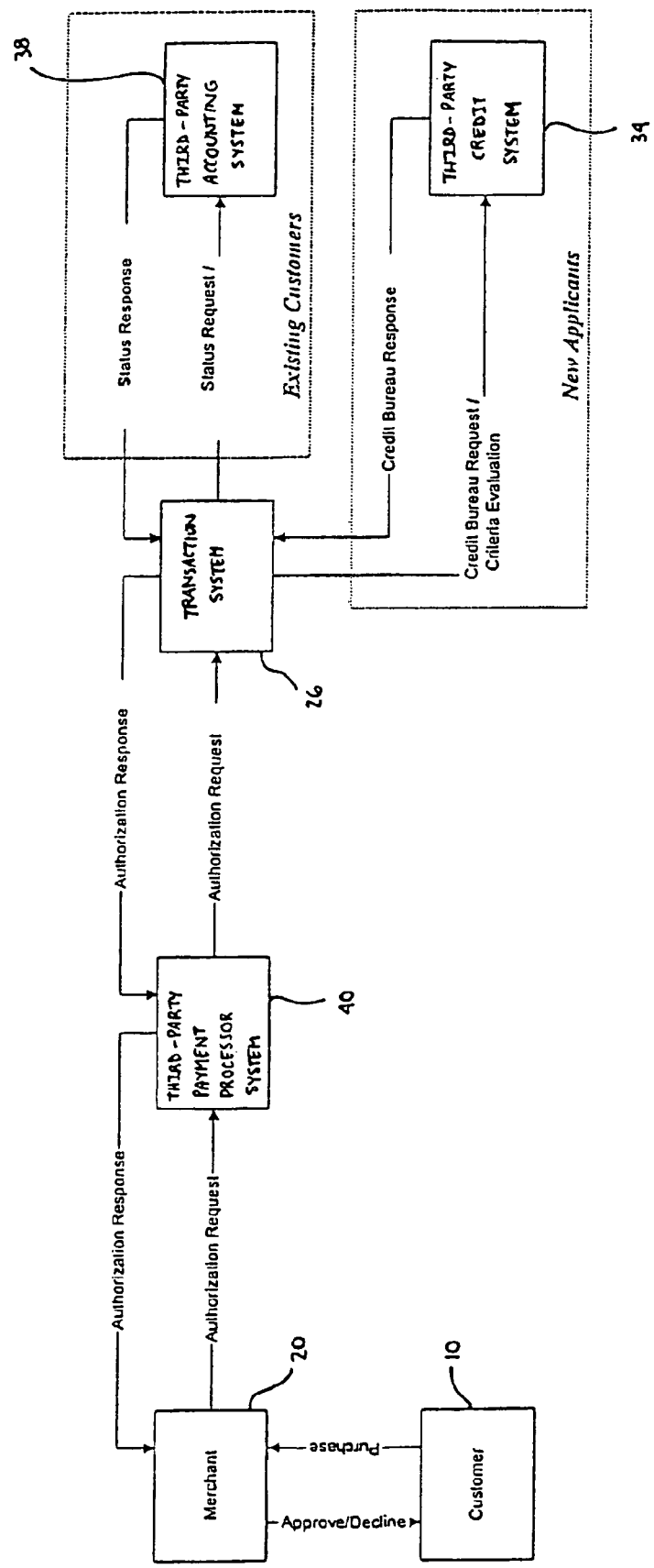
FIG. 3 is a schematic view of a credit/authorization process flow according to the present invention.

FIG. 3 illustrates the credit/authorization process flow for both new and existing customers. This embodiment uses a third-party payment processor system 40, a third-party accounting system 38 and a third-party credit system 34. As seen in this FIG. 3, when a customer 10 initiates a transaction with the merchant 20, the merchant 20 transmits an authorization request to the third-party payment processor 40. As described above, with a new customer, the customer data transmitted to the third-party payment processor system 40 would be the authorization key, which is now a privately-held credential between the merchant 20 and the transaction system 26. The third-party processor system 40 sends the customer data, authorization key (if available) and the transaction specific data to the transaction system 26. If it is a new customer, the transaction system 26 interacts with the third-party credit system 34 via the credit authorization subsystem 32, and authorizes, approves and establishes a new customer account. A customer-specific file history database is maintained on either the accounting subsystem 36 or the third-party accounting system 38, and, for each subsequent transaction, a customer history is built for each customer account on this database.

When a repeat customer attempts to initiate a subsequent transaction, the transaction system 26 analyzes the customer history in the customer-specific file history database and, may also send a status request to the third-party accounting system (if used) in order to allow this third-party accounting system 38 to conduct this analysis. The third-party accounting system 38 then returns a status response to the transaction system 26, either approving or disapproving the subsequent transaction. If the analyzed customer history indicates that the customer 10 meets the set criteria for rejection of the transaction, the transaction system 26 communicates a declination or rejection to the customer 10, preferably via the payment processing subsystem 28 and the merchant 20.

However, if approved, the transaction system 26 transmits its authorization response to the third-party processor system 40, who in turn, transmits this authorization to the merchant 20. Finally, the merchant 20 completes the transaction with the customer 10, as described above. It is envisioned that, in some instances, the merchant 20 will not transmit the customer-specific authorization key to the transaction system 26, but instead, will send a limited customer data set. This limited customer data set contains enough customer data to allow the transaction system 26 to analyze the customer data and match the pre-established customer-specific authorization key with the customer 10. This also may occur when only one authorization key is used for the customer 10. For example, if the same customer 10 attempts to initiate a transaction at a different merchant 20, that different merchant may or may not have access to the authorization key of that customer 10. Therefore, the merchant 20 would send either the limited or full and expanded customer data set to the transaction system 26, and the transaction system 26 would then match the customer 10 with the customer-specific transaction key. This allows the transaction system 26 to determine whether a new customer account should be established, or whether the customer 10 is a pre-existing customer 10 and already has an account on the transaction system 26.

In order to allow the customer 10 to service his or her account, the transaction system 26 may generate a customer-specific user identification and password for the customer account on the transaction system 26. When the account is established, the transaction system 26 sends this user identification and password directly to the customer 10. In order to allow a customer 10 to maintain his or her account, the transaction system 26 may also include a user interface, which is, accessible by the user having the valid user identification and password. In operation, the customer 10 accesses the user interface on the transaction system 26 using the user identification and password, and the transaction system 26 then presents to the customer 10 certain account maintenance options. For example, the account maintenance options may include allowing the customer 10 to view his or her account status, view a transactional history of the account, settle a transaction on the account, complete a registration process, initiate chargeback transactions and view account history. When using a third-party accounting system 38, the transaction system 26 retrieves this customer account data from the third-party accounting system 38.

Whether the customer account is created on the transaction system 26, namely the accounting subsystem 36 or the third-party accounting system 38, the customer accounting database or the customer-specific file history database track the transactions of the customer 10. These databases may be discrete, linked or combined as one overall customer database. In addition, the transaction system 26 is configured to post new customer accounts, post monetary transactions, post non-monetary transactions and generate customer-specific statements. However, as discussed above, when a third-party accounting system 38 is utilized, the transaction system 26 must communicate the customer data, the transaction specific data and, preferably, the authorization key, to the third-party accounting system 38, where the third-party accounting system 38 performs these functions.

Since the authorization key is the private credential between the merchant 20 and the transaction system 26, it is preferably not transmitted to the customer 10. However, it may be transmitted to the merchant 20, the third-party payment processor system 40, the third-party credit system 34 and/or the third-party accounting system 38. However, since all of these systems are secure, the ultimate goal of fraud reduction is achieved.

While the credit authorization process is typically used for new customers that are not pre-approved, it is also envisioned that the credit authorization subsystem 32, with or without the third-party credit system 34, could be used periodically for repeat customers 10. For example, in some instances, it may be useful to perform a credit evaluation of a customer 10 on an annual basis or when the customer 10 desires increased credit. This periodic credit checking is invisible to the customer 10, and therefore, poses no negative inferences to the customer 10.

One of the benefits of the present invention is the ability for the central control/authorization subsystem 30, the accounting subsystem 36 and/or the third-party accounting system 38 to aggregate multiple transactions with multiple merchants 20 in a single statement. The statement may then be transmitted to the customer 10 on a periodic basis for payment. In addition, in using a user interface by the customers 10, reconciliation, maintenance and presentation may occur on the transaction system 26. Like a credit card, the transaction system 26 allows credit purchases, account maintenance and merchant aggregation at a reduced risk of fraud.

In order to fully or partially settle a customer account or a transaction of the customer account, a settlement/deposit request is sent by the merchant 20 to the payment processor 28 or third-party payment processor system 40, and this request is then sent to the transaction system 26. The account is settled on the transaction system 26, particularly the accounting subsystem 36, and a settlement record is transmitted by the transaction system 26 to the payment processor subsystem 28 or the third-party payment processor system 40. As before, if a third-party accounting system 38 is utilized, the settlement/deposit request must be sent to this system as well. The settlement amount is deposited with the payment processor subsystem 28 or the third-party payment processor system 40, and, finally, the settlement record is transmitted to the merchant 20. When the transaction system 26 includes the payment processor subsystem 28 and the accounting subsystem 36, the settlement may be posted directly between the merchant 20 and the transaction system 26.

A merchant 20 must be approved by the transaction system 26 prior to the extension of credit to any of the merchant's customers 10. Therefore, a merchant profile may also be communicated from the merchant 20 to the transaction system 26. This merchant profile is used by the transaction system 26 to verify the format of the authorization transaction; retrieve the list of required application data elements; verify that the proper terms and conditions were presented to the customer 10; validate any promotional offers made by the merchant 20; and, retrieve internal processing parameters used to correctly route the transaction through the transaction system 26. If however, a transaction is completed between a customer 10 and a merchant 20 without authorization from the transaction system 26 within a predetermined period of time, this transaction is deemed "out of compliance." For such "out of compliance" transactions, a chargeback adjustment process is used to initiate a chargeback. Such authorizations may be collected on an authorization or other database on the transaction system 26. If such a database is utilized, the transaction specific data for each transaction is entered onto the database. As discussed above, this authorization database may be discrete, linked, or combined with the other databases on the transaction system 26.

Another benefit of the present invention is its optional notification process. In order to decrease fraud, each subsequent transaction (or other variable frequency) initiated by the customer 10 may initiate a notification from the transaction system 26 to the customer 10. If an unauthorized consumer is somehow able to initiate a transaction on the transaction system 26, the rightful customer 10 will quickly know that there has been activity on his or her account. If this occurs, the customer 10 may then take the necessary steps to correct the unauthorized transaction. This notice function could be optionally triggered on every account transaction, transactions over a specific monetary amount, or other similar criteria.

Figure 4:
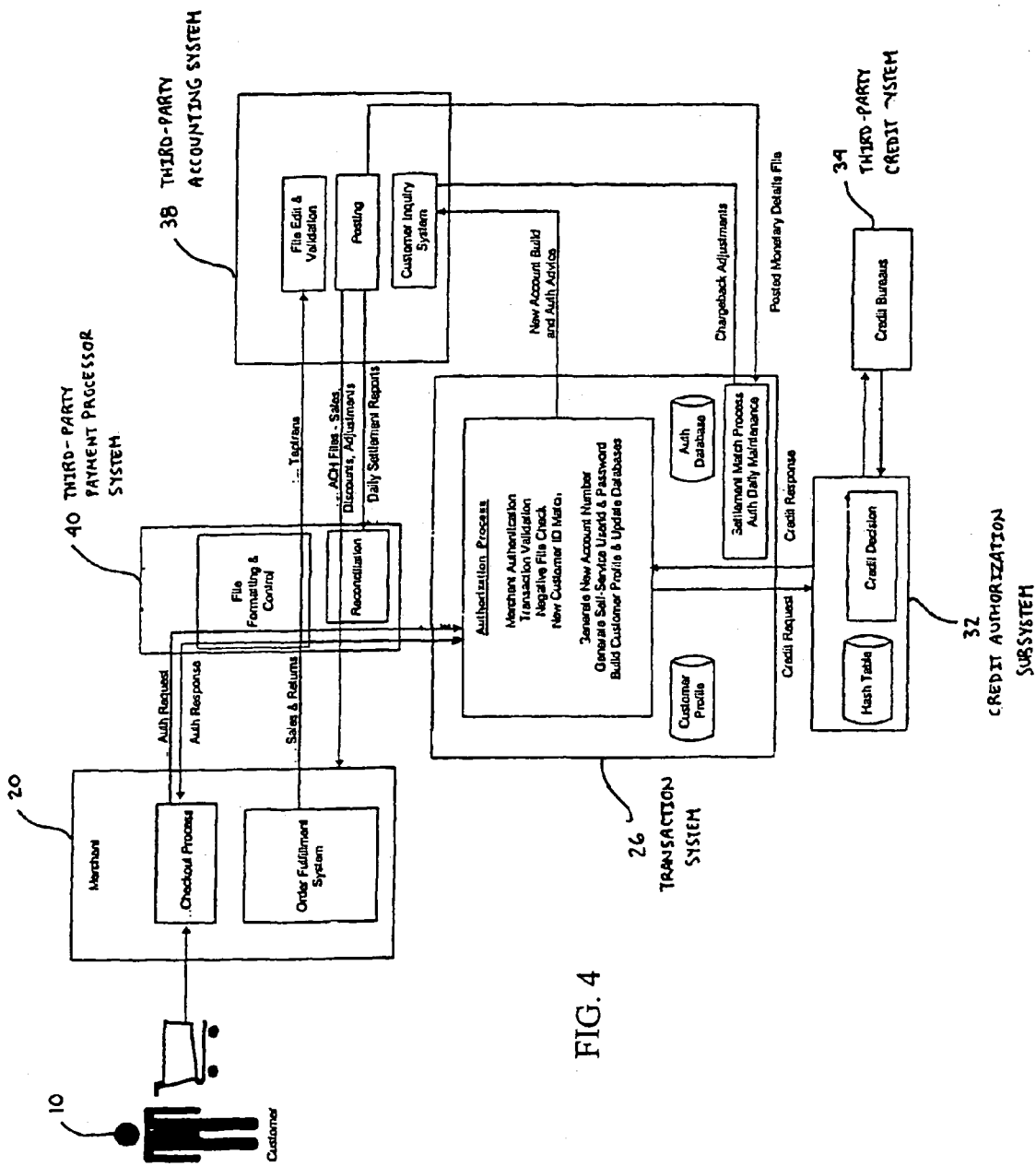
FIG. 4 is a schematic view of another embodiment of a method and system for completing a transaction between a new customer and a merchant according to the present invention.

FIG. 4 illustrates another embodiment of the present invention when a transaction is initiated between a new customer 10 and a merchant 20. First, the customer 10 enters the checkout process at the merchant 20 and requests the present invention as the preferred method of billing. The merchant 20 may offer the present invention to all customers 10, to their existing best customers 10, to customers 10 who have been prequalified for its use, or may use some other targeting approach agreed upon with the transaction system 26. In addition, the merchant 20 may present promotional banners or can offer the present invention with other payment options.

Next, the merchant 20 transmits an authorization request message to a third-party payment processor system 40. This message includes the customer identification, credit qualification information, and transaction validation information. The third-party payment process system 40 will validate the message and format it into standard authorized format and forward the transaction information to the transaction system 26. The authorization process will validate the transactional data against the required format and content. Further, the transaction system 26 will check the customer's identification information, such as mailing address, shipping address, and computer IP address against a negative database file to determine if there is any derogatory history. If the consumer or customer 10 is declined due to negative file checks, the transaction system 26 will send an automated message to the credit authorization subsystem 32 or third-party credit system 34 in order to generate a decline letter to the customer 10. The transaction system then creates a match key or authorization key based upon the customer identification and verifies that the new customer 10 is not an existing customer 10. This situation may occur if the customer 10 uses a different merchant 20.

Next, the transaction system 26, using the credit authorization subsystem 32, will send the third-party credit system 34 a request for approval. For externally pre-approved customers 10, the transaction system 26 will use a local database to match the customer's pre-approval number against existing credit information. As discussed above, the transaction system 26 has the logic to complete the credit decision internally. However, it is envisioned that all pre-approval credit-decline letters could be generated by the third-party credit system. Next, the credit authorization subsystem 32 will check a "hash" table to see if the customer 10 had already been recently decisioned. If the customer 10 has not been recently decisioned, the decision engine will request a credit report from the third-party credit system 34 or an outside credit bureau. The credit authorization subsystem 32 will apply credit scoring criteria and will yield a decision.

When a credit decision is reached and sent back to the transaction system 26 or to the central control/authorization subsystem 30 of the transaction system 26, the transaction system 26 will generate a customer account number. For approved customers 10, the transaction system 26 will also generate a self-service site initial user identification and password, which is then e-mailed to the customer 10. The customer 10 will be able to click on a link in the e-mail to log in to the self-service site and complete the registration process.

For approved customers, the transaction system 26 builds the customer profile in the local operational data store. An authorization approval code is generated, namely the authorization key, and the purchase transaction is recorded in an authorization or other database such as a customer account or customer-specific file history database. Next, a message is sent to the third-party accounting system 38 to build the new account. The new account record typically includes the name, address, credit score, promotional code, source merchant code, credit segment, and terms and conditions version. An entry is then posted on the new account describing the authorized transaction, including the merchant, amount, date, etc. Next, the authorization response message is sent back to the third-party payment processor system 40 and on to the merchant 20. The merchant 20 updates the customer profile with the customer account number or authorization key.

The merchant 20 sends the sales transaction to the third-party payment processor system 40 when the order is fulfilled. The third-party payment processor system 40 reformats the transaction into a standard format and sends the transaction to the third-party accounting system 38. Next, the third-party accounting system 38 edits and validates the file into dollar totals, which are communicated back to the third-payment processor system 40 for verification.

The third-party accounting system 38 performs a nightly batch (or possibly real-time) process update cycle that posts new accounts, monetary transactions, non-monetary transactions and also produces statements. In addition, this third-party accounting system 38 transmits a daily ACH transaction (or wire transfer) via the Federal Reserve network to the third-party payment processing system 40. Separate ACH deposits are made for sales, discounts and adjustments. The third-party payment processor system 40 will calculate the discount and make payment to the merchants 20 for their net sales. The third-party accounting system 38 transmits the daily settlement reports to the third-party payment processor system 40, who uses the reports to reconcile the ACH deposits. Finally, the third-party accounting system 38 transmits the daily posted monetary detail files to the transaction system 26.

The transaction system 26 performs daily settlement match processes. The settlement match process matches the settlement transactions to the databases, and if a sale has been posted without a corresponding authorization with allowable time frames, the item is flagged as "out of compliance." The authorization or corresponding database on the transaction system 26 is processed to "age off" authorization records and to query the status of "out of compliance" items. If an "out of compliance" item was posted to an account that has gone into a derogatory status, a chargeback adjustment for that item is generated. The chargeback adjustments are sent to the third-party accounting system 38 for posting.

Figure 5:
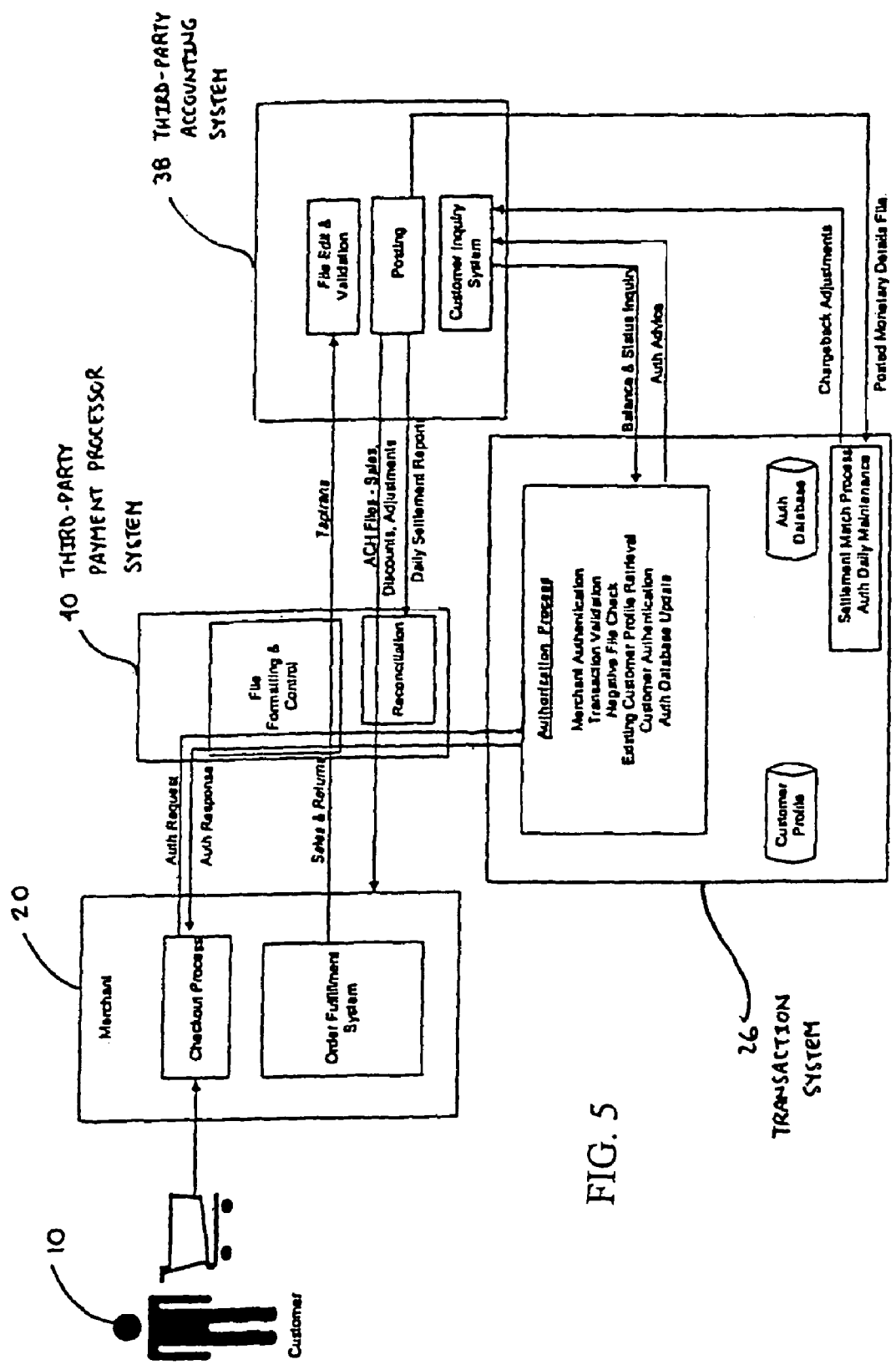
FIG. 5 is a schematic view of a further embodiment of a method and system for completing a transaction between an existing customer and a merchant according to the present invention.

Turning to FIG. 5, yet another embodiment is illustrated for use in the present invention with an existing customer. As seen in FIG. 5, the customer 10 enters the checkout process with the merchant 20 and requests the present invention as the billing option. The merchant 20 transmits the authorization request message to the third-party payment processor system 40, and this message includes the authorization key, and transaction specific data, and possibly credit qualification information and other customer information. The transaction system 26 receives the authorization request and authenticates the merchant's required formatting content.

The authorization process will validate the transaction-required format and content. It will check the customer's identification information, such as the IP address, mailing address, date of birth, name, shipping address, authorization key, etc., against a negative database file to determine if there is any derogatory history. Next, the authorization key is used to retrieve the customer's profile. The transaction system 26 then sends either a batch or real-time request to the third-party accounting system 38 for the account balance and status. If the third-party accounting system 38 is unavailable, the transaction system 26 will use the previously retrieved balance and status information to complete the authorization decision. This authorization process uses the customer profile, the customer balance and status and the transaction specific details to determine whether to approve the transaction. If the transaction is approved, an authorization response number is generated, and the transaction details are posted to the authorization or other database. Further, if the transaction is approved, an advice of authorization is placed on the third-party accounting system 38 and if the transaction is declined, a declination detail forewarning is placed on the third-party accounting system 38. The authorization is sent back to the third-party payment processor system 40, and on to the merchant 20. If approved, the merchant 20 sends the sales transaction to the third-party payment processor system 40 when the order is fulfilled and third-party payment processor system 40 reformats the transaction and sends it to the third-party accounting system 38, who edits and validates the file and communicates the dollar total back to the third-party payment processing system 40 for verification. As discussed with the previous embodiment, the third-party accounting system 38 performs daily operations and communicates with both the third-party payment processor system 40 as well as the transaction system 26. The process flow continues as described with the above embodiment.

Figure 6A:
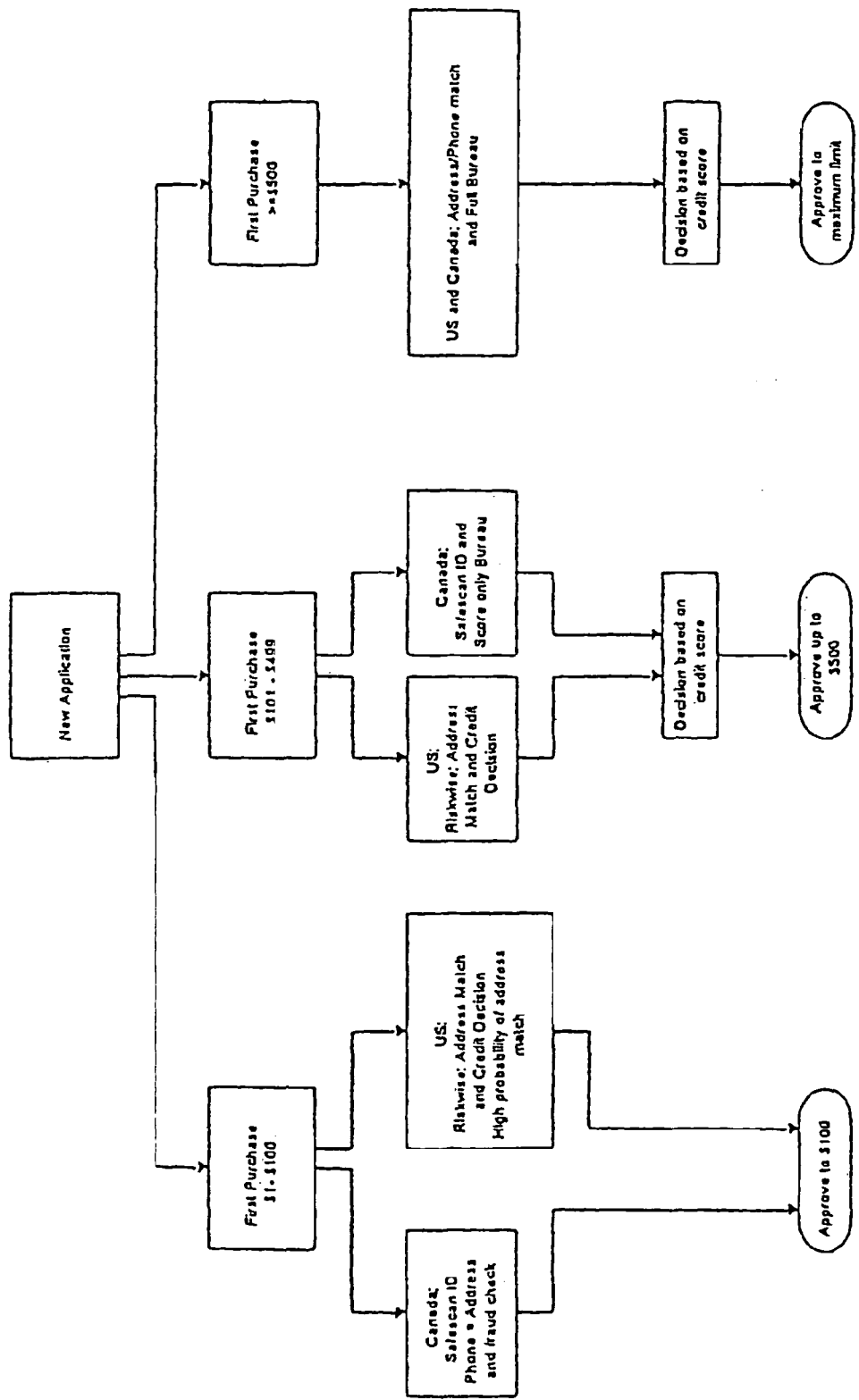
FIG. 6a is a flow diagram of an application and first purchasing authority decision process according to the present invention.
Figure 6B:
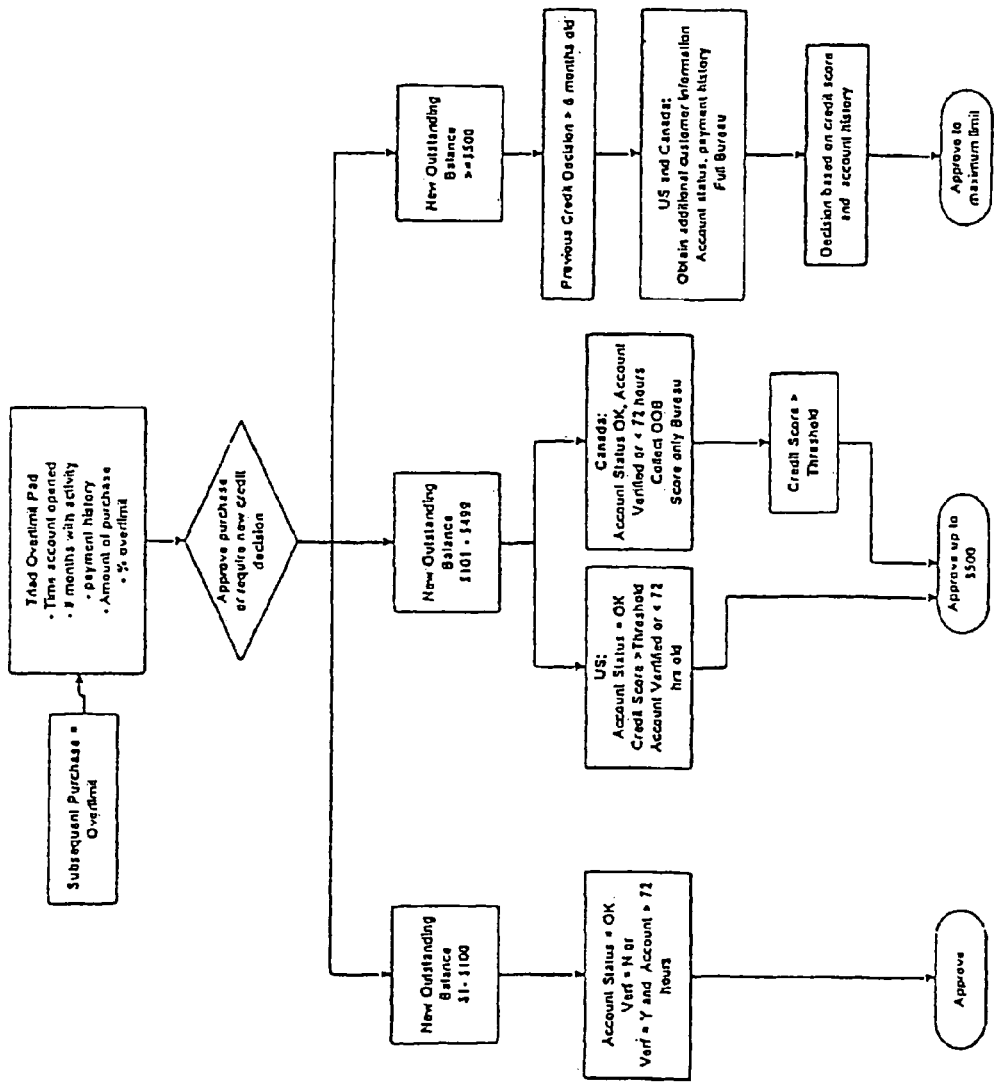
FIG. 6b is a flow diagram of a purchasing authority limit increase process according to the present invention.

FIGS. 6a and 6b illustrate a first credit decision process and the credit limit increase process. For the first credit decision process, the transaction dollar amount must first be analyzed. If the purchase amount is between $1 and $100, the transaction system 26 determines the customer 10 country of origin. In this embodiment, if the customer 10 is from Canada, an identification, phone, address, and fraud check is performed prior to approval. If the customer 10 originates in the United States, an address match, and credit decision occur. For a first purchase of between $101 and $499, a more advanced credit decision and checking process is utilized as performed by the credit authorization subsystem 32 and/or the third-party credit system 34. Finally, for purchases of over $500, a full credit decision is reached using the credit authorization subsystem 32, the third-party credit system 34 and/or an outside credit bureau.

As seen in FIG. 6b, when a subsequent purchase by the customer 10 is over the previous limit, an over-limit process is initiated, which evaluates the time the account was opened, the number of months of activity, the payment history of the customer 10, the amount of the purchase, and the percent over the limit. This subsequent purchase is then approved or may require a new credit decision. If the new outstanding balancer is between $1 and $100 and the account status is good, the subsequent purchase is approved. If the new outstanding balance is between $101 and $499, depending upon the country of origin, a credit authorization process is again undertaken prior to approval. Finally, if the new outstanding balance is greater than $500, and the previous credit decision is greater than six months, additional customer information, account status, payment history and other information is obtained, together with a new credit decision using an outside credit bureau. The decision to approve such a purchase is based on the credit score and account history.

As seen in Table 5, various reasons exist for either approving or declining a customer 10 in the credit authorization process. Basically, these decisions are made based on the degree of fraud or credit-worthiness risk presented. A low risk customer 10 results when the application information matches the credit bureau, and the returned credit score indicates a low level risk, and further, the transaction amount is moderate to low. A moderate risk is obtained when some application information may not match the credit bureau, and the credit score indicates moderate fraud risk or the transaction amount is moderate to high. Finally, a high risk is obtained with a high degree of mismatch, and a credit score which indicates a high fraud risk or a high transaction amount. Obviously, a higher fraud risk results in more conservative credit lines and a higher degree of verification in post-approval.

TABLE 5

| Condition | Auth-e response | Transaction System condition | Auth-E Response Code | Description |
| --- | --- | --- | --- | --- |
| Declined | Decline | Decline | 100 | General Decline/Credit Bureau Decline |
| Declined - insufficient open to buy | Decline | Decline | 110 | The sale amount causes the customer's balance to exceed the customer's purchasing power. |
| Declined - Under 18 Years Old | Decline | Decline | 101 | The birth date submitted on the Authorization request indicates the customer is less than 18 years of age. |
| Declined - Bill-to Country not 'USA' | Decline | Decline | 102 | Initially for Transaction System the bill to address country must be US or a US territory. |

TABLE 5-continued

| Condition | Auth-e response | Transaction System condition | Auth-E Response Code | Description |
|---|---|---|---|---|
| Declined - Bill-to not equal Ship-to | Decline | Decline | 103 | On physical shipments, for the first purchase the Ship-to address must equal the Bill-to address. |
| Declined - Foreign Currency | Decline | Decline | 104 | Initially Transaction System will only access authorizations and settlements in US dollars. |
| Declined - Invalid E-mail Address | Decline | Decline | 105 | The email address failed standard validation rules. |
| Declined - Negative File | Decline | Decline | 106 | The Authorization was declined. Transaction System credit operations needs to provide any further information. |
| PA ITA Number Inactive | Decline | Decline | 107 | The Authorization was declined because the preapproval number is no longer valid. |
| Declined - Blocked Account | Decline | Decline | 108 | The Authorization was declined due to the billing system account status. |
| Declined - Purchase amount exceeds max | Decline | Decline | 109 | The Authorization was declined because the amount exceeds the maximum charge for the merchant. |
| Declined - Possible compromise | Decline | Decline | 201 | The Authorization was declined because the customer reported a possible compromise and blocked the account. |
| Error - Required Data Elements Missing | Decline | Error | 202 | The Authorization was declined because the required fields for the merchant, customer type, and shipping type were not provided on the Authorization request. |
| Error - Format Error | Decline | Error | 203 | The Authorization was declined because the Authorization request message was incorrectly formatted. |
| Error - Invalid T&C Version | Decline | Error | 204 | The Authorization was declined because the T&C Version was not valid for the merchant. |
| Error - Invalid Merchant ID | Decline | Error | 205 | The Authorization was declined because the merchant identification number was not a valid Transaction System merchant. |
| Error - Account number not on file | Decline | Error | 206 | The Authorization was declined because the customer account number was not a valid Transaction System customer. |
| Error - Invalid pre-approval code | Decline | Error | 207 | The Authorization was declined because the preapproval number is not recognized. |
| System Unavailable | Decline | Error | 301 | The Authorization was declined due to an unrecoverable system error. |
| Stand in decline | Decline | Decline | 302 | The Authorization was declined using stand-in rules. The authorization may be approved if it is submitted when all back-end systems are available. |
| Global risk manager fail 1 | Decline | Decline | 400 | The Authorization was declined. Transaction System credit operations needs to provide any further information. |
| Global risk manager fail 2 | Decline | Decline | 401 | The Authorization was declined. Transaction System credit operations needs to provide any further information. |
| Global risk manager fail 3 | Decline | Decline | 402 | The Authorization was declined. Transaction System credit operations needs to provide any further information. |
| Global risk manager fail 4 | Decline | Decline | 403 | The Authorization was declined. Transaction System credit operations needs to provide any further information. |
| Original Auth Not Found | Decline | Decline | 501 | The re-authorization request was declined. The original authorization could not be found. |

TABLE 5-continued

| Condition | Auth-e response | Transaction System condition | Auth-E Response Code | Description |
|---|---|---|---|---|
| Original Auth Not Matched | Decline | Decline | 502 | The re-authorization request was declined. The customer account number, merchant id, or amount did not match the original authorization. |
| Reauthorization Exceeds Original Amount | Decline | Decline | 503 | The re-authorization request was declined. The amount significantly exceeds the original request amount. |
| Reauthorization Timeframes Exceeded | Decline | Decline | 504 | The re-authorization request was declined. The timeframes for re-authorization have been exceeded. |
| Reauthorization Declined Due to Account Status | Decline | Decline | 505 | The re-authorization request was declined due to the current billing system account status. |

It is also envisioned that the credit process may be based on the customer 10 revolving debt level and the age of the oldest file update at the credit bureau. Building revolving balances more quickly tends to move an applicant toward the low credit line strategy. In addition, the process is used to assign customers with no credit bureau history, customers with no prior delinquency and customers with a prior delinquency to different credit groups. Further, approved customers 10 may also be manually checked against telephone directory databases for the validity of the name/phone number and address combination. Verification failures may result if the errors are serious.

Overall, the credit authorization process is similar to the process that is engaged in by the bank 12 or the bank decision engine 14, along with the credit bureaus or third-party credit system 34. However, as discussed above, the customer 10 does not receive a credit card, but instead only receives approval for the transaction. The authorization key is held as the private credential by the merchant 20 and the transaction system 26. It is envisioned that any means for verifying and correctly identifying the customer 10 may be utilized.

Figure 7:
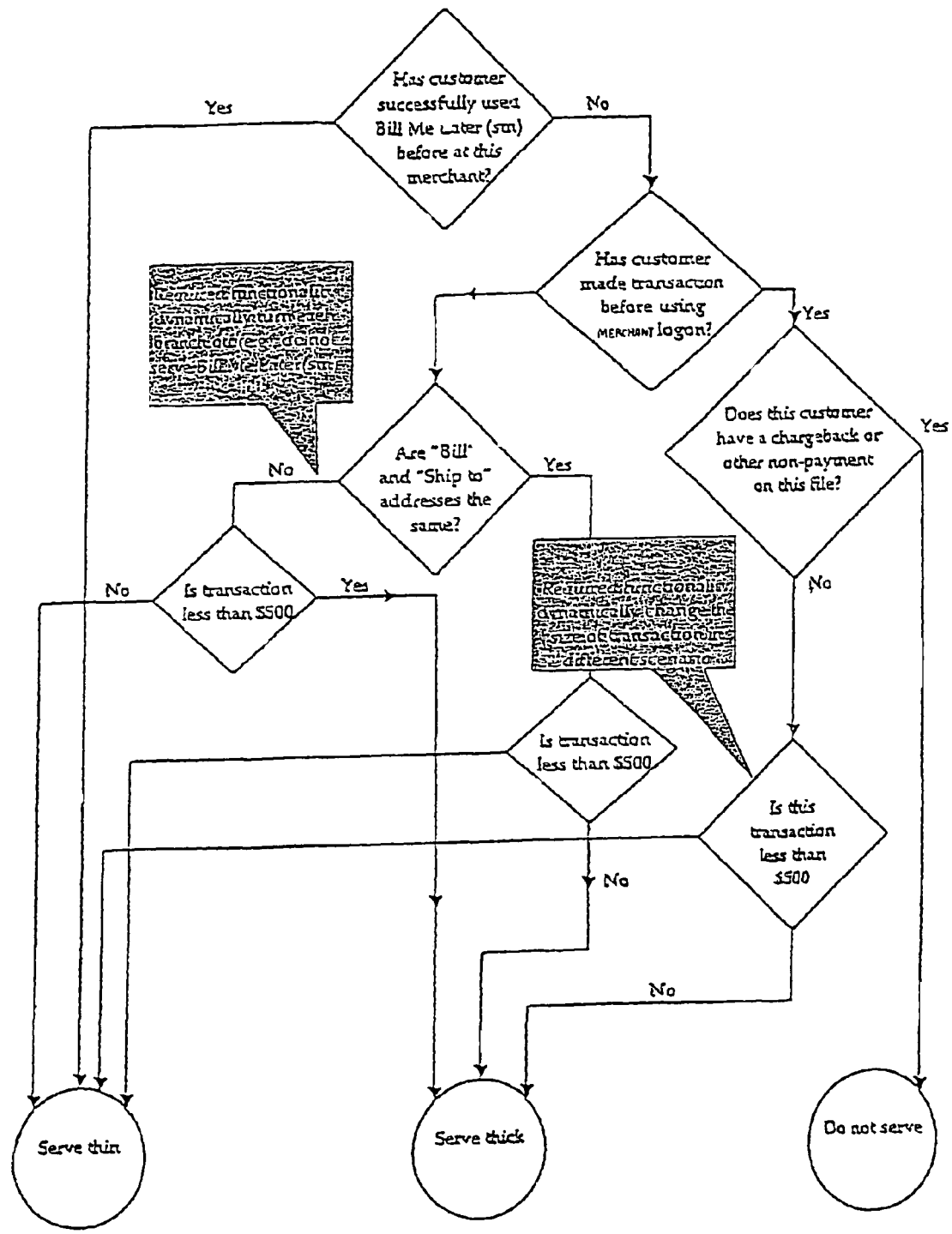
FIG. 7 is a flow diagram of an application presentation process according to the present invention.

FIG. 7 illustrates the decision process for determining what information should be provided by the customer 10. If the customer 10 has successfully used the present invention at the merchant 20, minimal information is required for subsequent purchases. If the customer 10 has made a transaction before using a merchant's log-in sequence, the system may determine and match the bill-to and ship-to addresses. If these addresses do not match but the transaction is less than $500, minimal customer information may be required. However, if the transaction is greater than $500, the expanded data set of information would be required. This similar decision process may be used if the bill-to and ship-to addresses are the same. Also important in the process is whether the customer 10 has a chargeback or other non-payment on the account. Such negative file history may result in denying the transaction.

The present invention is an efficient process, and a typical data exchange will involve an encrypted XML message sent over the Internet using SOAP protocol over HTTPS. However, for high volume merchants 20, the present invention may also offer frame relay or other high-speed and direct means of communication. Response time for new customers 10 is expected to be sub-10 seconds. Existing customer authorization is expected to be in the 3 to 5 second range. Of course, these estimates are somewhat dependent on the communication protocol chosen and whether the merchant 20 operates in different modes within the transaction system 26. In addition, authorization messages between the transaction system and other systems will preferably adhere to the ISO 8583 format. The preferred communication technology uses IP protocols over, a Virtual Private Network (VPN) connection or a direct free relay or other high-speed, direct communication method.

The present invention offers considerable functionality. The merchant 20 may display commercial banners, may participate in the pre-approval process, may offer the present invention payment option to all or targeted customers, may request authorizations, submit transactions, maintain customer profiles and resolve purchasing disputes directly with the customer 10. The user-accessible interface of the transaction system 26 may be a self-service web site allowing the customer 10 to conveniently and accurately perform direct account inquiries and maintenance. For example, the customer 10 may view their current account balance, payment information, and last three months' transactions. Further, the customer 10 may update their address and other profile information. In addition, a secure e-mail system is available directly from the site to customers 10. For communication, the transaction system 26 may use a correspondence operation function to perform customer care for customers 10 who submit inquiries or requests via postal mail. All customer service functions can be performed within a correspondence group, and responses to customers may be made via e-mail or postal mail. Retrievals, exception payments, returned mail, and microfilm conversion may also be provided. All policies covering procedures and letter or e-mail text are developed and monitored by the transaction system 26.

A voice response system may be used to provide a 24-hour automated information and service to customers 10 using the telephones. The voice response units may provide balance and payment information and may temporarily block an account if the customer 10 suspects their account has been compromised. Real-time live agents may also be used.

Customer security features may be provided for the detection of fraud patterns and to make outbound contacts. Further, such functionality may investigate fraud reports. Collections functionality may be provided to handle inbound and outbound contacts from delinquent customers 10 and to apply a variety of strategies to collect payments. Further, a lending facility may be used to provide and conduct lending and receivables funding.

Overall, the present invention is a method and system for completing a transaction between a customer 10 and a merchant 20 which integrates new customer underwriting and account setup processes into the established credit card transaction authorization process. The present invention provides for using the customer data, such as the customer's name, address, phone number, date of birth and social security number to uniquely identify the customer account using an authorization key. Further, the present invention allows for the aggregation of multiple transactions for multiple merchants from the same customer onto one bill, which can be presented to the customer 10 in paper or electronic form.

Further, the present invention allows for the dynamic presentment of this payment option based on the transaction and customer information. The method and system provides for distributed authentication, whereby the existing merchant log-in credentials are used to authenticate the customer 10 prior to the use of the present invention payment option. In addition, the present invention provides for single authorization split shipments, where a single authorization is used to approve a basket of goods when the goods are delivered in multiple shipments and results in multiple settlement transactions. The present method and system reduces the chance of theft and fraudulent use of account numbers by replacing the typical credit card account number with a private authorization key. This enforces a positive authentication of the customer 10 at the time of transaction initiation. The present invention redesigns the standard authorization process into an expanded authentication process using an expanded set of customer information. Still further, the present method and system provides real-time account status checking and validation.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A computer-implemented method for completing a transaction between a customer and at least one merchant, comprising the steps of:
    receiving, by a transaction system, an authorization request including customer data and transaction specific data from the merchant, wherein, prior to the authorization request, the customer is unknown to the transaction system;
    authenticating the customer by the transaction system based at least in part upon at least one of the following: at least a portion of the customer data, at least a portion of the transaction specific data or any combination thereof;
    authorizing the transaction by the transaction system based at least in part upon at least one of the following: at least a portion of the customer data, at least a portion of the transaction specific data or any combination thereof;
    communicating the authorization response to the merchant;
    establishing a customer account on the transaction system; and
    creating a customer-specific authorization key that is unknown to the customer and privately held between the transaction system and the merchant, wherein the authorization key is transmitted from the merchant to the transaction system during subsequent transactions with the customer and the merchant.

2. The method of claim 1, wherein the authorization key is at least partially derived from the customer data.

3. The method of claim 1, wherein the customer is assigned a plurality of authorization keys.

4. The method of claim 1, wherein the customer account number is identical to the customer-specific authorization key.

5. The method of claim 1, further comprising the steps of:
    establishing a customer accounting database on a third-party accounting system;
    establishing a customer account on the customer accounting database;
    communicating at least one of the customer data, the authorization key and the transaction specific data to the third-party accounting system; and
    updating the customer account on the customer accounting database.

6. The method of claim 1, further comprising the steps of:
    communicating an authorization request for a subsequent transaction by the customer to a merchant including the authorization key and transaction specific data;
    analyzing customer account balance and customer account status;
    authorizing the subsequent transaction by the transaction system; and
    communicating an authorization response from the transaction system to the merchant.

7. The method of claim 6, further comprising the steps of:
    establishing a customer accounting database on a third-party accounting system;
    establishing a customer account on the customer accounting database;
    communicating the authorization key and transaction specific data to the third-party accounting system; and
    updating the customer account on the customer accounting database.

8. The method of claim 6, wherein the subsequent transaction involves the same customer and a different merchant.

9. The method of claim 1, further comprising the steps of:
    communicating an authorization request for a subsequent transaction by the customer to a merchant including the customer data and transaction specific data;
    matching the customer to the customer-specific authorization key based upon the customer data;
    analyzing customer account balance and customer account status;
    authorizing the subsequent transaction by the transaction system; and
    communicating an authorization response to the merchant.

10. The method of claim 9, further comprising the steps of:
    establishing a customer accounting database on a third-party accounting system;
    establishing a customer account on the customer accounting database;
    communicating the authorization key and transaction specific data to the third-party accounting system; and
    updating the customer account on the customer accounting database.

11. The method of claim 9, wherein the subsequent transaction involves the same customer and a different merchant.

12. The method of claim 1, wherein the transaction system includes a credit authorization subsystem, and further comprises the steps of:
    communicating at least one of the customer data, the authorization key and the transaction specific data to the credit authorization subsystem; and
    determining an authorization response for the customer and the transaction by the credit authorization subsystem.

13. The method of claim 12, further comprising the steps of:
communicating at least one of the customer data, the authorization key and the transaction specific data from the credit authorization subsystem to a third-party credit system;
receiving a credit check of the customer from the third-party credit system; and
receiving an authorization response from the third-party credit system to the credit authorization credit subsystem.

14. The method of claim 13, wherein the authorization response includes a customer credit score.

15. The method of claim 1, further comprising the step of:
prior to establishing a new customer account, determining whether the customer has a pre-existing customer account on the transaction system.

16. The method of claim 1, wherein the customer-specific authorization key is derived from at least one of the customer name, the customer home address, the customer phone number, the customer facsimile number, the customer date of birth, the customer social security number, the customer billing address, the customer shipping address, the customer IP address, and the customer e-mail address.

17. The method of claim 1, further comprising the steps of:
creating a customer-specific file history database on the transaction system;
for each subsequent transaction, building a customer history for each customer account on the customer-specific file history database; and
for each subsequent transaction, analyzing the customer history on the customer-specific file history database.

18. The method of claim 17, further comprising the step of:
if the analyzed customer history indicates that the customer meets the set criteria for rejection for the transaction, communicating the rejection to the customer.

19. The method of claim 1, further comprising the steps of:
generating a customer-specific user identification and password for the customer account on the transaction system; and
communicating the customer-specific user identification and password to the customer.

20. The method of claim 19, wherein the transaction system includes a user interface accessible by a user having a valid user identification and password.

21. The method of claim 20, further comprising the steps of:
presenting to the customer account maintenance options when the customer accesses the user interface.

22. The method of claim 21, wherein the customer account maintenance options allow the customer to carry out at least one of the following steps:
view the account status, view a transactional history of the account, settle at least one transaction on the account, complete a registration process, initiate a charge back transaction, and view credit history.

23. The method of claim 20, wherein, the transaction system retrieves customer account data from a third-party accounting system.

24. The method of claim 1, wherein the customer account includes at least one of name data, address data, credit score data, promotional code data, source merchant code data, credit segment data, and terms and conditions version data.

25. The method of claim 1, wherein the authorization key is comprised of at least one of alphanumeric characters and symbolic characters.

26. The method of claim 1, wherein the transaction system is configured to carry out at least one of the following steps:
post new customer accounts, post monetary transactions, post non-monetary transactions and generate customer-specific statements.

27. The method of claim 1, further comprising the step of communicating at least one of the customer data, the transaction specific data and the authorization key to a third-party accounting system; and wherein the third-party accounting system is configured to carry out at least one of the following steps: post new customer accounts, post monetary transactions, post non-monetary transactions and generate customer-specific statements.

28. The method of claim 1, wherein the authorization key is communicated to at least one of the merchant, a third-party payment processor system, a third-party credit system and a third-party accounting system.

29. The method of claim 1, further comprising the steps of:
receiving an authorization request for a subsequent transaction by the customer to a merchant including the authorization key and transaction specific data from the merchant;
analyzing customer account balance and customer account status;
communicating at least one of the customer data, the authorization key and the transaction specific data to a credit authorization subsystem;
determining an authorization response for the customer and the transaction by the credit authorization subsystem;
authorizing the subsequent transaction by the transaction system; and
communicating an authorization response to the merchant.

30. The method of claim 1, further comprising the steps of:
receiving an authorization request including the customer data and transaction specific data from the merchant;
matching the customer to the customer-specific authorization key based upon the customer data;
communicating at least one of the customer data, the authorization key and the transaction specific data to a credit authorization subsystem;
determining an authorization response for the customer and the transaction by the credit authorization subsystem;
analyzing customer account balance and customer account status;
authorizing the subsequent transaction by the transaction system; and
communicating an authorization response to the merchant.

31. The method of claim 1, further comprising the steps of:
aggregating at least one transaction in a single statement; and
transmitting the statement to the customer on a periodic basis.

32. The method of claim 1, further comprising the steps of:
receiving a settlement/deposit request from the merchant;
posting a settlement in the transaction system;
transmitting a settlement record by the transaction system to the merchant; and
depositing a settlement amount with the merchant.

33. The method of claim 32, further comprising the steps of:
receiving a settlement/deposit request from a third-party payment processor system;
transmitting the settlement record to the third-party payment processor system; and depositing the settlement amount with the third-party payment processor system.

34. The method of claim 32, further comprising the steps of:
    transmitting the settlement/deposit request to a third-party accounting system;
    posting a settlement in the third-party accounting system; and
    receiving the settlement record from the third-party accounting system.

35. The method of claim 1, wherein the customer initiates the transaction on a secured merchant system.

36. The method of claim 35, wherein the secured merchant system is a web site requiring a log-in sequence.

37. The method of claim 1, wherein the transaction system includes a payment processor system for validating the customer data and the transaction specific data and arranging this data into a standard format.

38. The method of claim 1, wherein, prior to the authorizing, the transaction system authenticates the merchant.

39. The method of claim 1, further comprising the steps of:
    identifying a transaction that is completed between the customer and the merchant without authorization from the transaction system within a predetermined period of time as "out of compliance."

40. The method of claim 39, further comprising the step of:
    initiating a chargeback adjustment process for an "out of compliance" transaction.

41. The method of claim 1, further comprising the steps of:
    creating an authorization database on the transaction system; and
    entering the transaction specific data for each authorized transaction on the authorization database.

42. The method of claim 1, wherein the customer data includes at least one of the customer name, the customer home address, the customer phone number, the customer facsimile number, the customer date of birth, the customer social security number, the customer billing address, the customer shipping address, the customer IP address, and the customer e-mail address.

43. The method of claim 1, wherein the transaction specific data includes at least one of the unit description, unit model number, unit quantity, unit price, total price, service description, service price and warranty data.

44. The method of claim 1, further comprising the step of:
    if the authorization response is negative, communicating the rejection to the customer.

45. The method of claim 1, further comprising the step of:
    for each subsequent transaction initiated by the customer, transmitting, to the customer, a notification of customer account activity.

* * * * *